US012434319B2

(12) United States Patent
    Cooper

(10) Patent No.: US 12,434,319 B2
(45) Date of Patent: Oct. 7, 2025

(54) DEVICE FOR FEEDING A WIRE ELECTRODE

(71) Applicant: Elco Enterprises, Inc., Jackson, MI (US)

(72) Inventor: Edward L Cooper, Clarklake, MI (US)

(73) Assignee: ELCo Enterprises, Inc., Jackson, MI (US)

( * ) Notice: Subject to any disclaimer, the term of this patent is extended or adjusted under 35 U.S.C. 154(b) by 815 days.

(21) Appl. No.: 17/625,453

(22) PCT Filed: Jul. 9, 2020

(86) PCT No.: PCT/US2020/041432
§ 371 (c)(1),
(2) Date: Jan. 7, 2022

(87) PCT Pub. No.: WO2021/007448
PCT Pub. Date: Jan. 14, 2021

(65) Prior Publication Data
US 2022/0288714 A1    Sep. 15, 2022

Related U.S. Application Data

(60) Provisional application No. 62/871,810, filed on Jul. 9, 2019.

(51) Int. Cl.
    B23K 9/133    (2006.01)
(52) U.S. Cl.
    CPC .................... B23K 9/133 (2013.01)
(58) Field of Classification Search
    CPC ..... B23K 9/133; B23K 9/1333; B23K 9/1336
    See application file for complete search history.

(56) References Cited

U.S. PATENT DOCUMENTS 2,754,958 A    7/1956  Murrell et al.
3,430,832 A *  3/1969  Meyer .................. B23K 9/1336
                                              242/157 R
(Continued)

FOREIGN PATENT DOCUMENTS

DE      29915301 U1      7/2000
DE   102017113887 A1    12/2018
KR      20050095962 A   10/2005

OTHER PUBLICATIONS

Machine Translation of Alexander, DE 29915301, performed Oct. 29, 2024 (Year: 1999).*

Primary Examiner — Brian W Jennison
(74) Attorney, Agent, or Firm — Dickinson Wright PLLC

(57) ABSTRACT

A device for feeding a wire electrode includes a housing having an input port, an output port, and a cavity defined by the housing. The device also includes a first group of bearings and a second group of bearings disposed within the housing. Each of the bearings have a surface configured to engage and drive the wire electrode. Additionally, each of the bearings have teeth adjacent to the perimeter of the bearings. The teeth of the bearings forming the first group are in meshing engagement with each other, while the teeth of the bearings forming the second group are in meshing engagement with each other. The device also includes a drive sprocket within the housing and having teeth that mesh with the teeth of one of the bearings of the first group and the teeth of one of the bearings of the second group.

18 Claims, 13 Drawing Sheets

(56) References Cited

U.S. PATENT DOCUMENTS

| | | | |
|---|---|---|---|
| 3,693,858 A | 9/1972 | Araya et al. | |
| 5,816,466 A | 10/1998 | Seufer | |
| 6,472,894 B1* | 10/2002 | Wark | G01R 1/0483 |
| | | | 324/762.03 |
| 7,441,682 B2* | 10/2008 | Kerekes | B23K 9/12 |
| | | | 226/190 |
| 2009/0127526 A1 | 5/2009 | Zaruba | |
| 2014/0091070 A1 | 4/2014 | Burns et al. | |
| 2017/0136567 A1* | 5/2017 | Lahti | B65H 51/10 |
| 2017/0138409 A1 | 5/2017 | Giese et al. | |
| 2020/0246891 A1 | 8/2020 | Mehlman et al. | |

* cited by examiner

DEVICE FOR FEEDING A WIRE ELECTRODE

BACKGROUND

1. Field of the Invention

The present invention generally relates to systems and devices for the feeding of a consumable wire electrode used in gas metal arc welding.

2. Description of Related Art

Gas metal arc welding (GMAW) is a welding process in which an electric arc forms between a consumable MIG wire electrode and the workpiece metal(s), which heats the workpiece metal(s), causing them to melt and join.

However, the consumable MIG wire electrode must be fed through the system in such a manner that the appropriate amount of consumable MIG wire electrode is provided to the welding torch. An excessive rate of consumable MIG wire electrode material feed can cause excessive amounts of material utilized in bonding joints, while too low a feed rate of MIG wire electrode material can be equally problematic in that the joint may not have enough material to create an adequate weld.

SUMMARY

A device for feeding a wire electrode in accordance with an embodiment of the present invention includes a housing having an input port, an output port, and a cavity defined by the housing. The input port is configured to receive the wire electrode, while the output port is configured to output the wire electrode. The device also includes a first group of bearings disposed within the housing comprising at least two bearings and a second group of bearings disposed within the housing also comprising at least two bearings.

Each of the bearings have a surface around their outside perimeter configured to engage the wire electrode. Additionally, each of the bearings have gear teeth adjacent to the perimeter of the bearings. The teeth of the bearings forming the first group are in meshing engagement with each other, while the teeth of the bearings forming the second group are in meshing engagement engagement with each other. The device also includes a drive sprocket having gear teeth that are positioned in the cavity of the housing so as to mesh with the teeth of one of the bearings of the first group and the teeth of one of the bearings of the second group.

In one aspect, the drive sprocket is in mechanical communication with a motor disposed outside the cavity, wherein the motor is configured to turn the drive sprocket.

In one aspect, the motor is a pneumatic drive.

In one aspect, at least one of the bearings of the first group or one of the bearings of the second group is mounted to a rotatable frame, wherein the rotatable frame has an axis of rotation that is parallel to the axis of rotation to the bearings of the first group or the second group.

In one aspect, the rotatable frame further comprises a biasing member and an adjustment device, wherein the biasing member is configured to bias the rotatable frame towards the adjustment device.

In one aspect, the adjustment device is a threaded adjustment device.

In one aspect, the adjustment device further comprises a force sensor, the force sensor configured to generate a signal indicative of a force between the biasing member and the adjustment device.

In one aspect, each of the bearings define a circumferential surface configured to engage and drive the electrode in response to rotation of the bearings.

In one aspect, the circumferential surface is flat.

In one aspect, the teeth of each of the bearings are offset axially from the circumferential surface.

In one aspect, the teeth of each of the bearings are disposed on separate structure than the circumferential surface.

In one aspect, a pair of pivotable mounting plates, wherein each of the mounting plates supports one of the bearings of the group of bearings for rotation.

In one aspect, the mounting plates have an open state and a closed state, wherein in the open state the mounting plates are pivoted away from the closed state to increase the space between the bearings of each group of bearings.

In one aspect, at least one sensor is disposed between at least one of the mounting plates and a sidewall portion of the housing when the at least one of the mounting plates is in the closed state.

In one aspect, all of the bearings are rotated in response to rotation of the sprocket, wherein the sprocket directly contacts and meshes with a first one bearing of each group of bearings, and the other bearing of each group of bearings is directly contacted and driven by rotation of the first bearing of each group of bearings.

In another aspect, a device for conveying a consumable electrode is provided, including: a first set of bearings including a first primary bearing and a first secondary bearing having parallel axes of rotation and defining a space radially therebetween configured to receive and convey a consumable electrode; a second set of bearings offset relative to the first set of bearings and including a second primary bearing and a second secondary bearing having parallel axes of rotation that are parallel to the axes of rotation of the first set of bearings and defining a space radially therebetween configured to receive and convey the consumable electrode; wherein each of the bearings of the first set of bearings and the second set of bearings define a circumferential drive surface configured to frictionally engage a consumable electrode and a plurality of teeth; wherein each of the bearings of the first set of bearings and the second set of bearings include a plurality of teeth, wherein the first primary bearing is in direct meshed contact with the first secondary bearing in a first state of the device and the second primary bearing is in direct meshed contact with the second secondary bearing in a first state of the device; a common drive sprocket in direct meshed contact with the first primary bearing and the second primary bearing, wherein rotation of the drive sprocket directly rotates the first primary bearing and the second primary bearing, and rotation of the first primary bearing and the second primary bearing directly rotates the first secondary bearing and the second secondary bearing, respectively, when the device is in the first state.

In one aspect, the first secondary bearing and the second secondary bearing are out of meshed contact with the first primary bearing and second primary bearing, respectively, in a second state of the device.

In one aspect, the sprocket remains in direct meshed contact with the first and second primary bearings in the second state of the device.

In another aspect, a method for conveying a consumable electrode is provided, the method comprising the steps of: rotating a first drive sprocket; in response to rotating the first drive sprocket, directly rotating a first primary bearing and a second primary bearing via direct meshed contact between the first drive sprocket and the first primary bearing and direct meshed contact between the sprocket and the second primary bearing; in response to rotating the first and second primary bearings, rotating first and second secondary bearings via direct meshed contact with the first and second primary bearings, respectively; frictionally engaging a consumable electrode between the first primary bearing and the first secondary bearing, and frictionally engaging the consumable electrode between the second primary bearing and the second secondary bearing; driving the consumable electrode in a first direction in response to the frictional engagement and concurrent rotation of the first and second primary bearings and the first and second secondary bearings.

In one aspect, the sprocket is rotated in response to actuating a pneumatic drive.

In one aspect, the method includes detecting, via a sensor disposed in mechanical communication with at least one of the first secondary bearing and the second secondary bearing, a change in force applied to the first secondary bearing or the secondary bearing in response to change in the consumable electrode being conveyed through the device.

In one aspect, the method includes pivoting the first and second secondary bearings out of meshed contact with the first and second primary bearings via pivotal movement of mounting plates that support the first and second secondary bearings for rotation.

Further objects, features, and advantages of this invention will become readily apparent to persons skilled in the art after a review of the following description, with reference to the drawings and claims that are appended to and form a part of this specification.

DETAILED DESCRIPTION OF THE DRAWINGS

Figure 1:
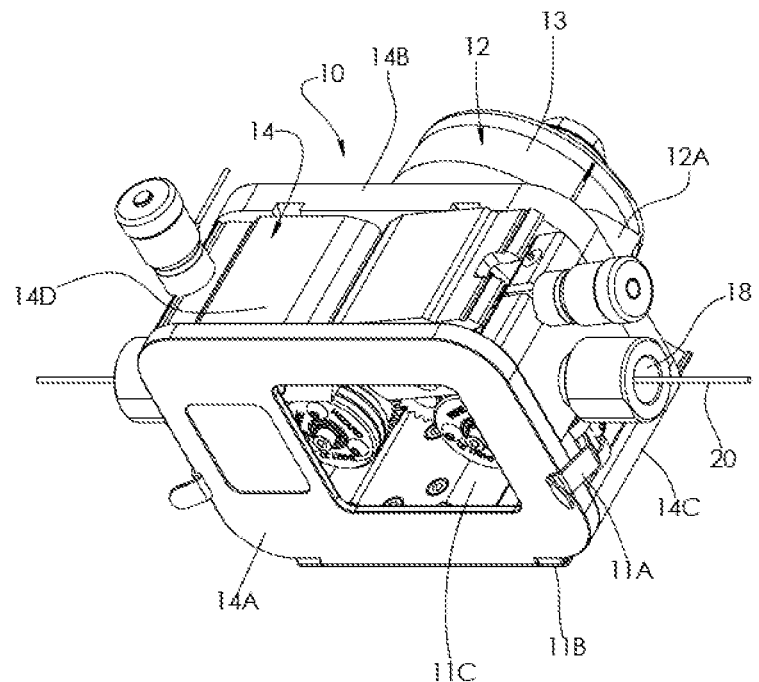
FIG. 1 is a perspective view of a device for feeding a consumable electrode wire for a gas metal arc welding system in accordance with an aspect of the disclosure.
Figure 2:
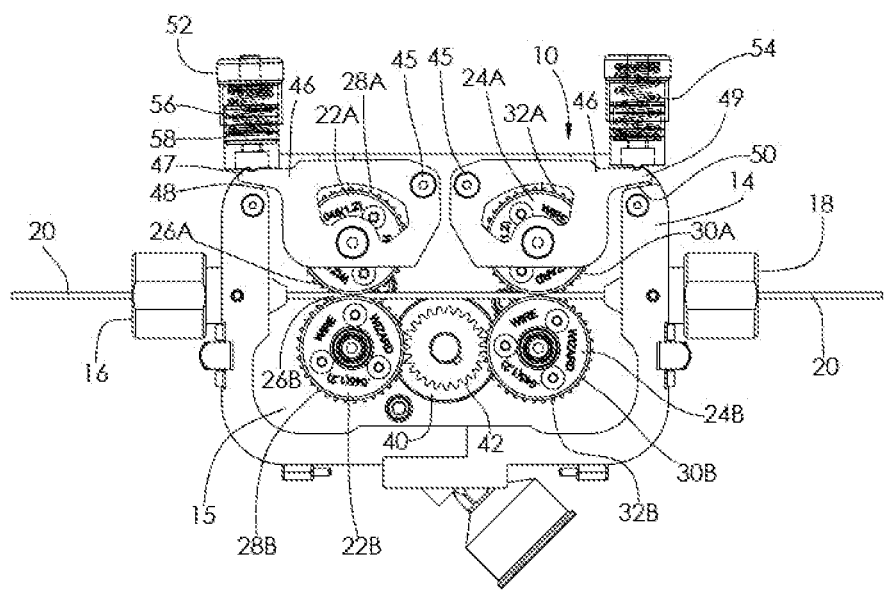
FIG. 2 is a front view of an interior of the device, in accordance with an aspect of the disclosure.
Figure 3:
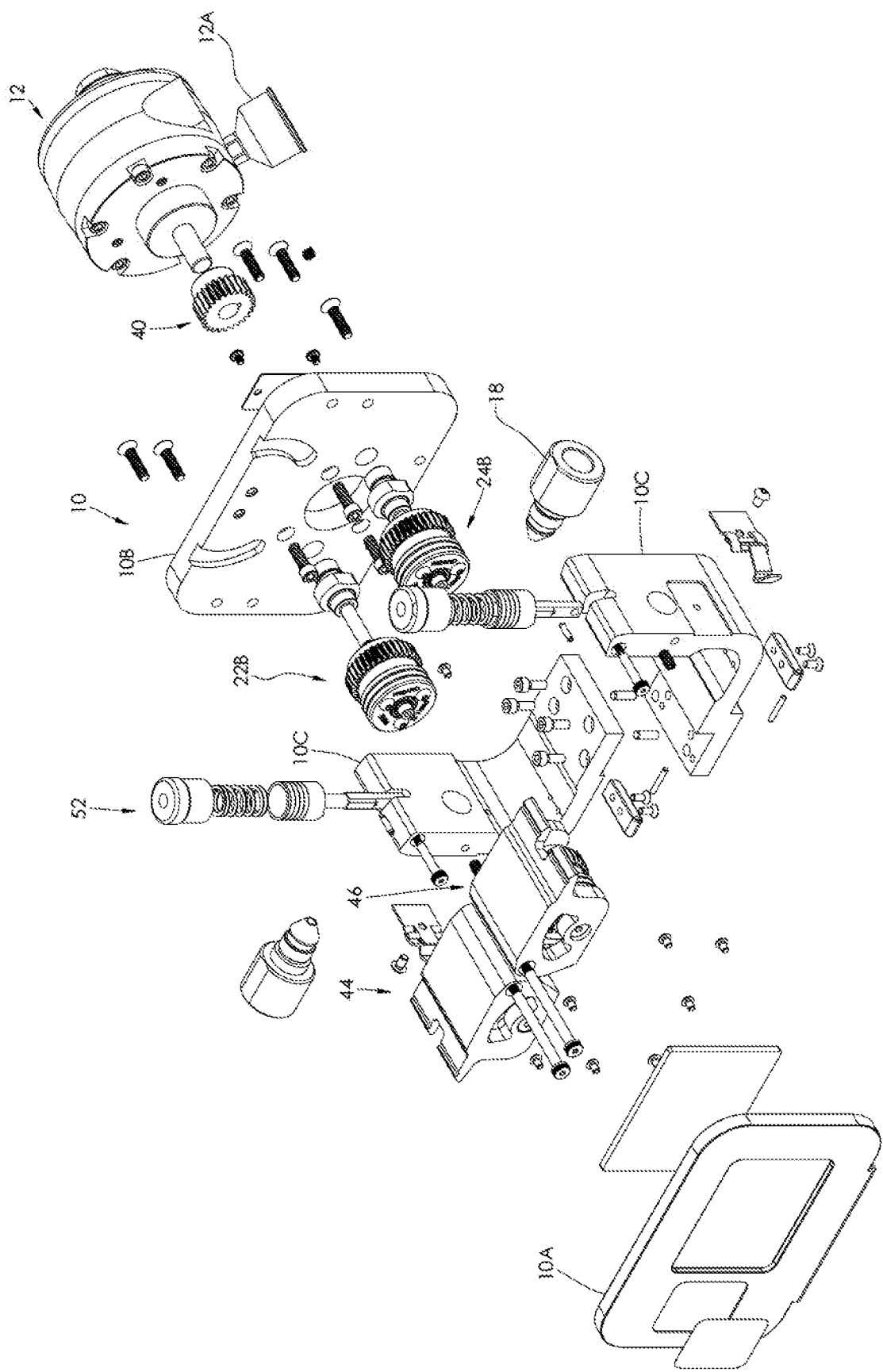
FIG. 3 is an exploded view of the device in accordance with an aspect of the disclosure.
Figure 4:
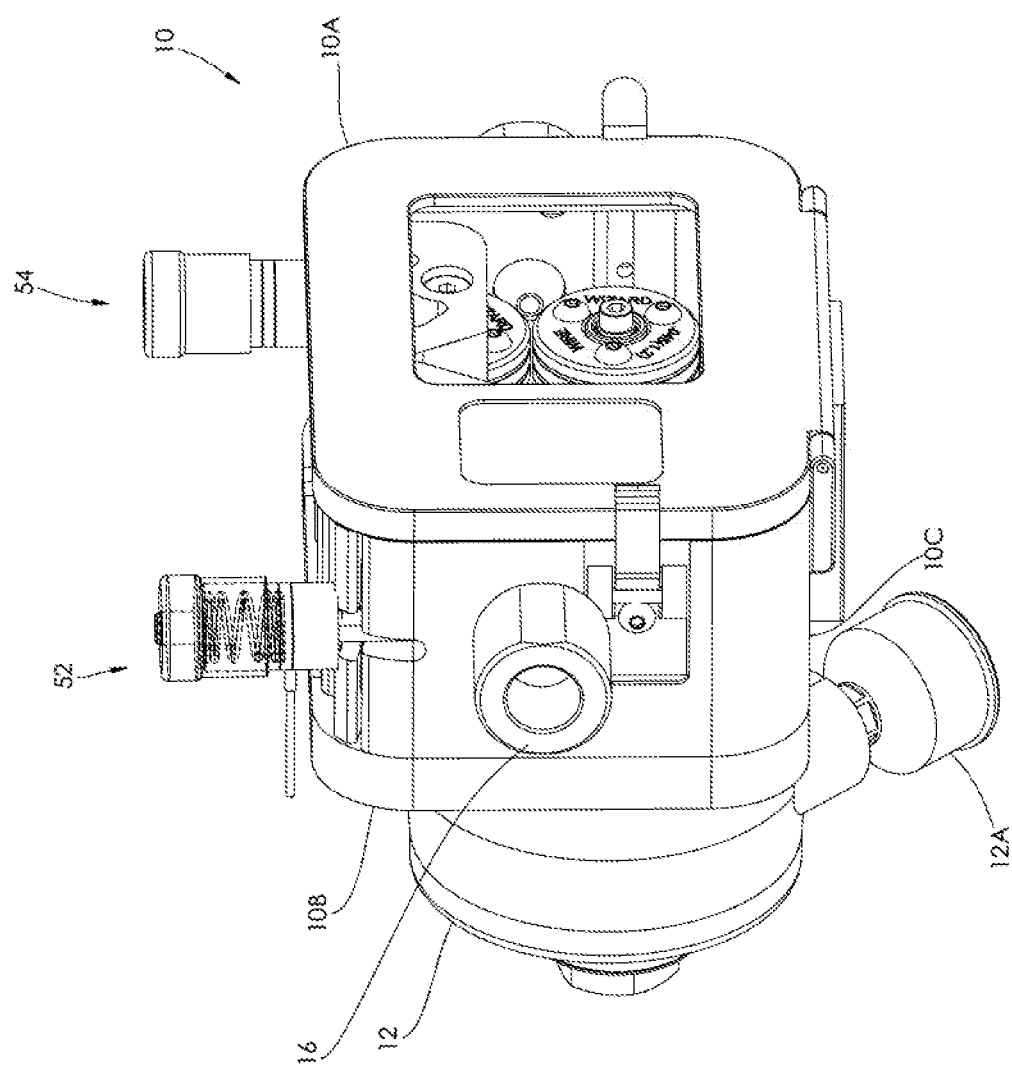
FIG. 4 is a left side isometric view of the device in accordance with an aspect of the disclosure.

Referring initially to FIGS. 1 and 2, with additional detail illustrated through FIGS. 1-14, a device 10 for feeding a consumable electrode wire 20 is provided. The device 10 has a housing 14 that generally defines a cavity 15. The device 10 includes a first port 16 and a second port 18, generally located on opposite sides of the housing 14. The first port 16 is configured to receive the consumable electrode 20, while the second port 18 is configured to output the consumable electrode 20. However, it will be appreciated that the electrode 20 may be fed in the opposite direction.

For purposes of discussion, the device 10 may be described as having an upper side, lower side, left side, right side, front side, and rear side, as shown in the orientation illustrated in FIGS. 1 and 2. It will be appreciated that these referenced directions are for demonstrative purposes, and that the device 10 may be oriented in various directions relative to the orientation used for illustration and demonstration, and that reference, for example, to upper does not require that a feature be "above" another feature in practice.

With special attention to FIG. 2, the device 10 generally includes a first group of bearings, such as bearings 22A and 22B, and a second group of bearings, which may include bearings 24A and 24B. The bearings may also be referred to as bearing pairs, upper and lower bearings, primary and secondary bearings, and/or the like. The bearings 22A and 22B are generally located opposite of each other with the electrode 20 being located in a space between. This pair of bearings 22A and 22B are on the left side of the device 10 as shown in FIGS. 1 and 2, and bearings 24A and 24B are on the right side. The bearings 24A and 24B are also located opposite of each other with the electrode 20 being located in the space between as well. The electrode 20 is sized and arranged to travel within the space between the bearing pairs 22A-B and 24A-B. Put another way, each pair of bearings is arranged to sandwich the electrode 20 between the upper and lower bearings of each pair, with rotation of the bearings driving the electrode 20 through the device in accordance with the direction of rotation of the bearings.

In another aspect, the bearings 22A and 22B may be disposed such that bearing 22A is above 22B as illustrated in FIG. 2. Similarly, bearings 24A and 24B may be disposed such that bearing 24A is above bearing 24B. The described spaces may thereby be disposed vertically between the vertically oppositely disposed bearings.

The bearings 22A and 22B of the first group rotate about two separated axes that are substantially parallel to each other. As shown in FIG. 2, the axes are spaced apart and aligned vertically relative to each other as shown in FIG. 2. The bearings 22A and 22B each have surfaces 26A and 26B configured to grip the electrode 20. The surfaces 26A and/or 26B may be generally concave in shape so as to better receive the electrode 20 which may, for example, have a substantially circular and/or elliptical cross-section.

The bearings 22A and 22B also each have a plurality of teeth 28A and 28B that are configured to engage one another. As such, the bearings 22A and 22B are in mechanical gear meshing engagement with each other such that when one of the bearings turn, the other meshed bearing will also turn, but in the opposite rotational direction. This turning of the bearings 22A and 22B essentially feeds the wire through the device 10, as the surfaces 26A and 26B frictionally engage the electrode wire 20 and drive the electrode wire 20.

The same is generally true for the second group of bearings 24A and 24B. The bearings 24A and 24B of the second group rotate about two separated axes that are substantially parallel to each other and vertically spaced. The bearings 24A and 24B each have surfaces 30A and 30B configured to grip the electrode 20. The surfaces 30A and/or 30B may be, for example generally concave in shape so as to better receive the electrode 20 which may have a substantially circular and/or elliptical cross-section.

The bearings 24A and 24B also each have a plurality of teeth 32A and 32B that are configured to mesh with each another. As such, the bearings 24A and 24B are in mechanical gear meshing engagement with each other such that when one of the bearings turn, the other bearing will also turn, but in the opposite rotational direction.

This turning of the bearings 24A and 24B essentially feeds the wire 20 through the device 10, as the surfaces 30A and/or 30B frictionally engage the electrode wire 20.

As described in further detail below, the bearings 22A-B and 24A-B may be actively driven or turned by the device 10 to feed the electrode 20 through the device 10. Put another way, the bearings 22A-B and 24A-B may be considered active bearings rather than passive bearings that rotate in response to pushing/pulling the electrode 20 via other mechanisms.

As described above, the bearings 22A-B and 24A-B define spaces therebetween through which the electrode 20 may be fed. The spaces are defined by the opposing surfaces 26A-B and 30A-B. The surfaces, in one aspect, may be concave therefore providing for feeding an electrode 20 with a convex outer profile, such as circular or elliptical as described above.

The concave curvature defined by the surfaces of the bearings 22A-B and 24A-B may be defined to have a larger curvature or radius than that of the electrode 20, such that the electrode may be in contact with the lowermost or uppermost portion of the curved surface.

In another aspect, the surfaces of the bearings 22A-B and 24A-B may be U-shaped and may define a flat surface against which the electrode 20 may bear. It will be appreciated that other curvatures or surface profiles may be used for the bearings 22A-B and 24A-B in some embodiments that may operate to frictionally engage the electrode for driving and feeding the electrode 20 through the device 10.

Figure 5:
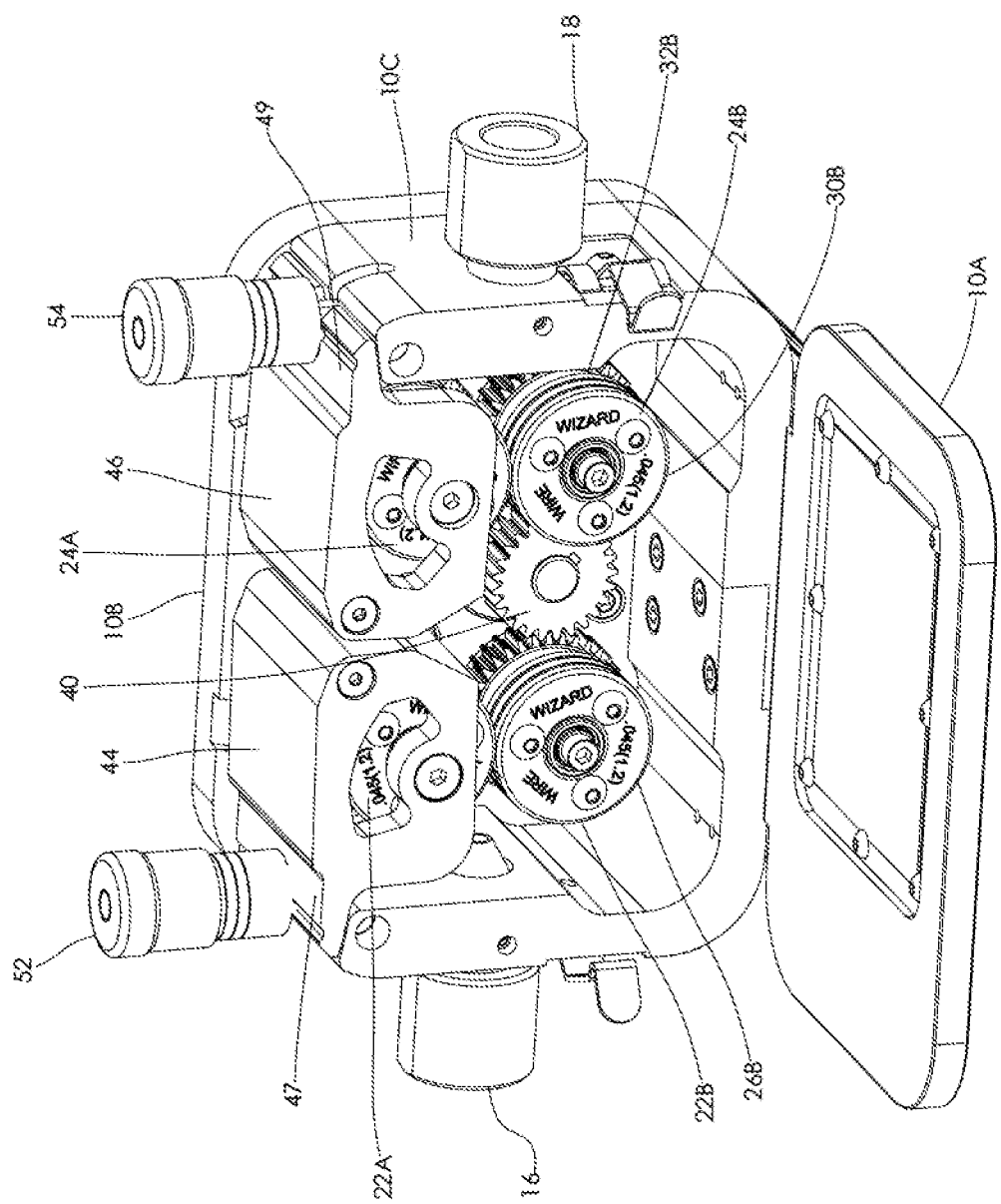
FIG. 5 is a front isometric view of the device with a front portion in an open position illustrating pairs of bearings disposed within a cavity of the device in accordance with an aspect of the disclosure.
Figure 6:
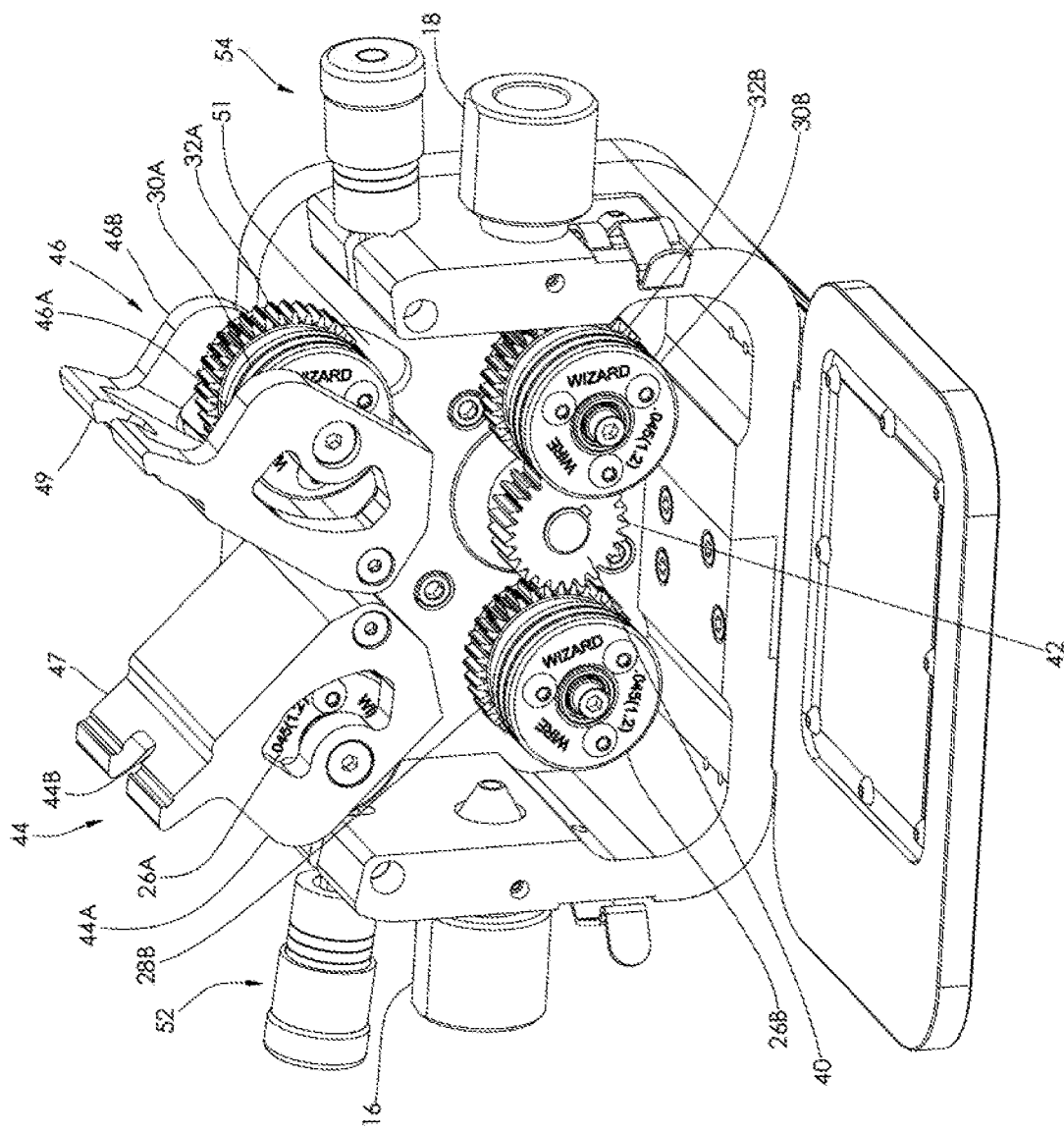
FIG. 6 is a front isometric view of the device with the front portion open and a pair of mounting plates carrying upper bearings pivoted to an open state in accordance with an aspect of the disclosure.
Figure 7:
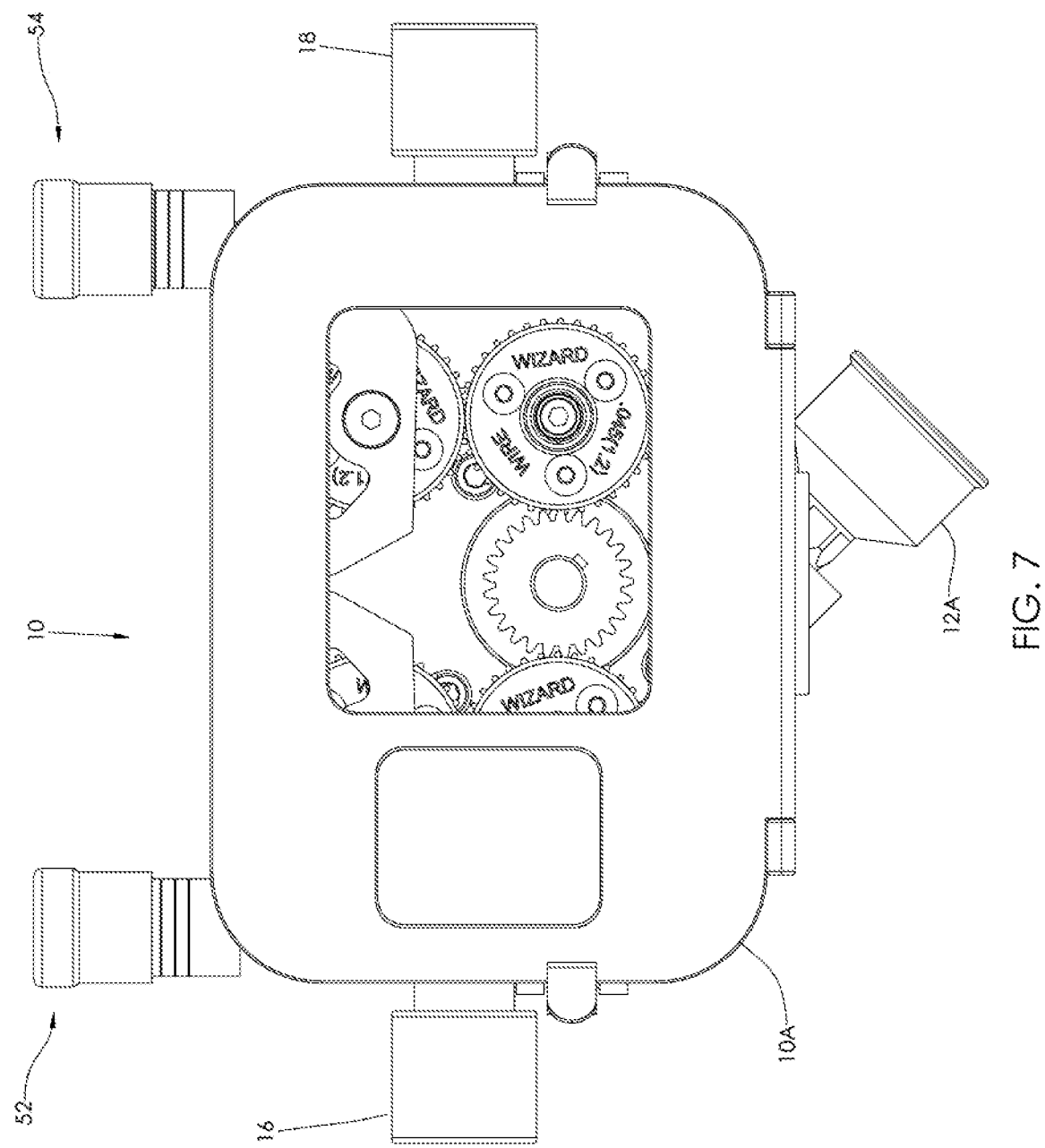
FIG. 7 is a front view of the device with the front portion closed, in accordance with an aspect of the disclosure.
Figure 8:
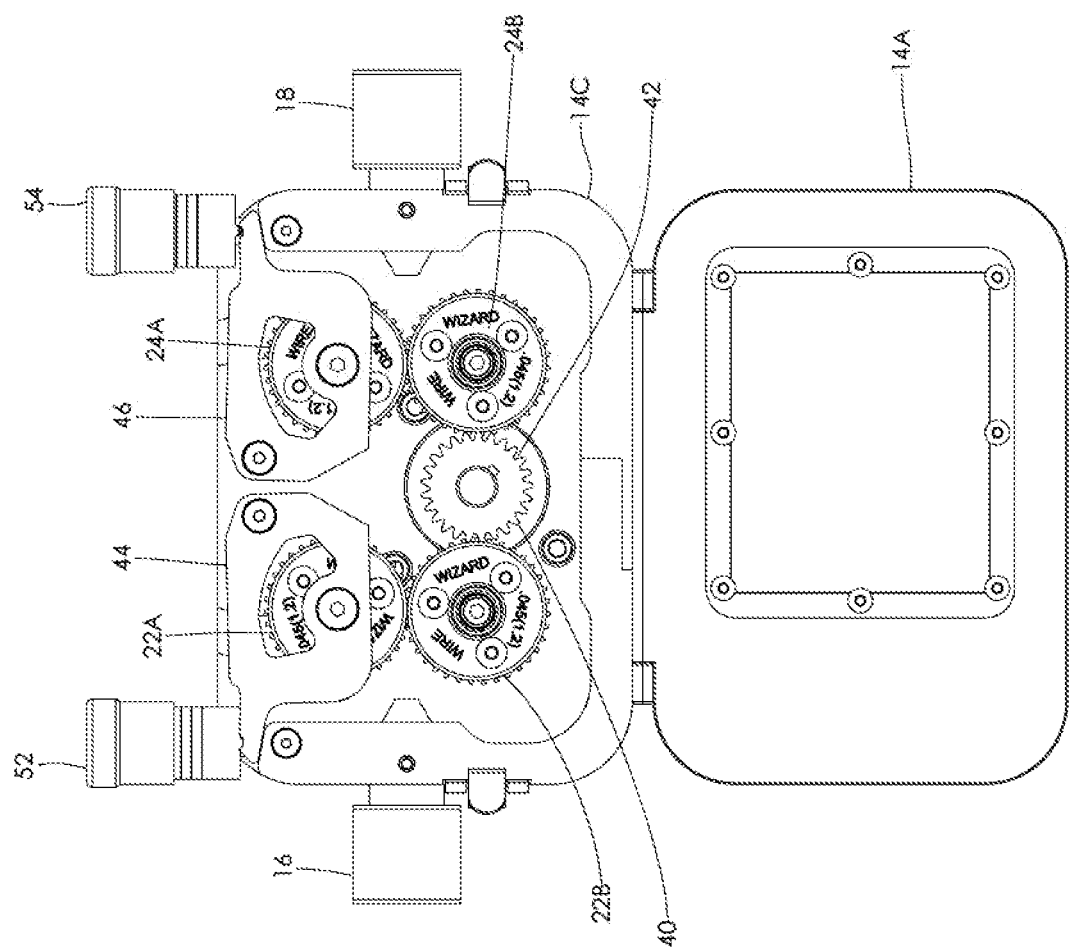
FIG. 8 is front view of the device with the front portion open in accordance with an aspect of the disclosure.
Figure 9:
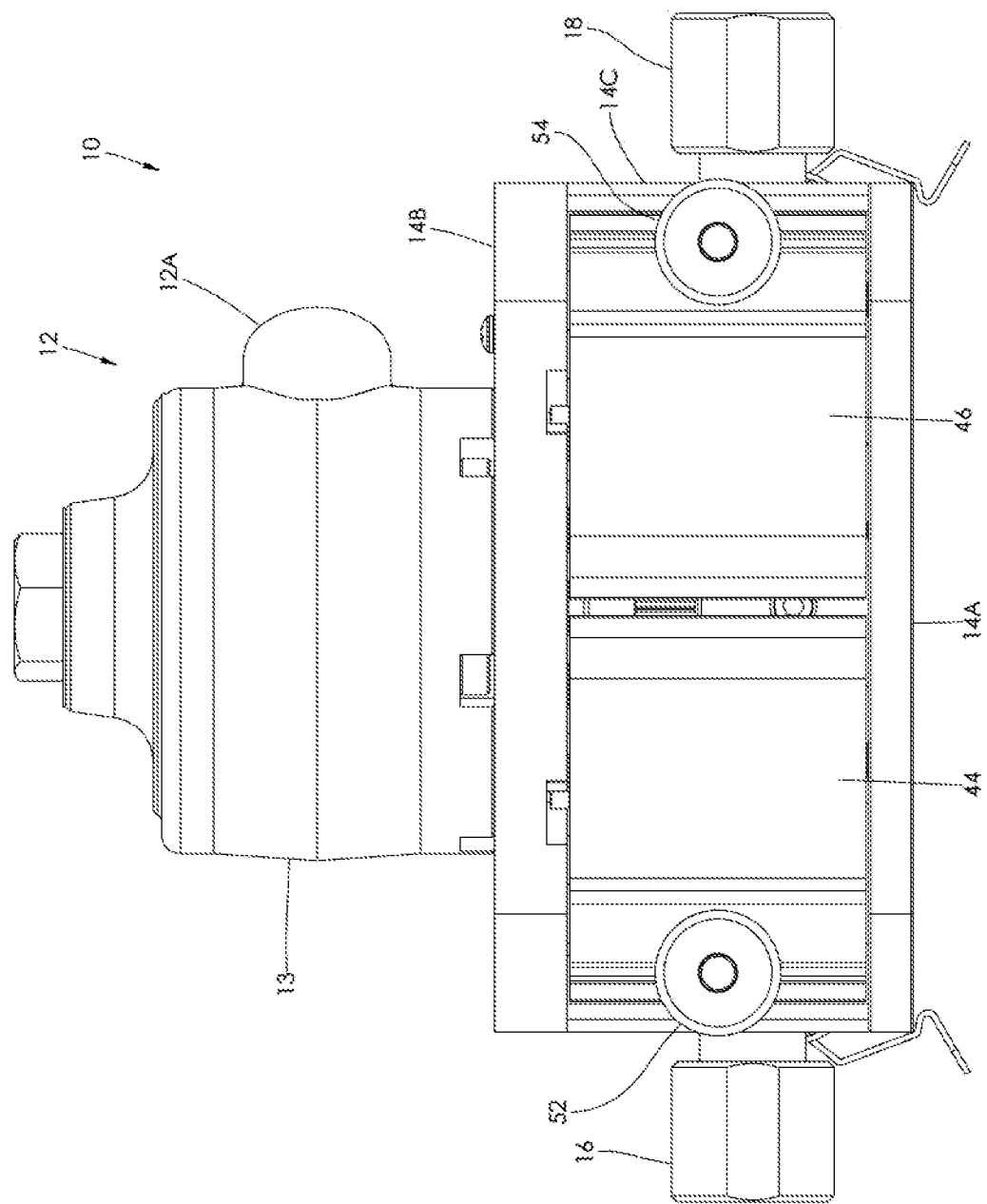
FIG. 9 is a top view of the device an illustrating a pneumatic drive attached on the rear of the device in accordance with an aspect of the disclosure.
Figure 10:
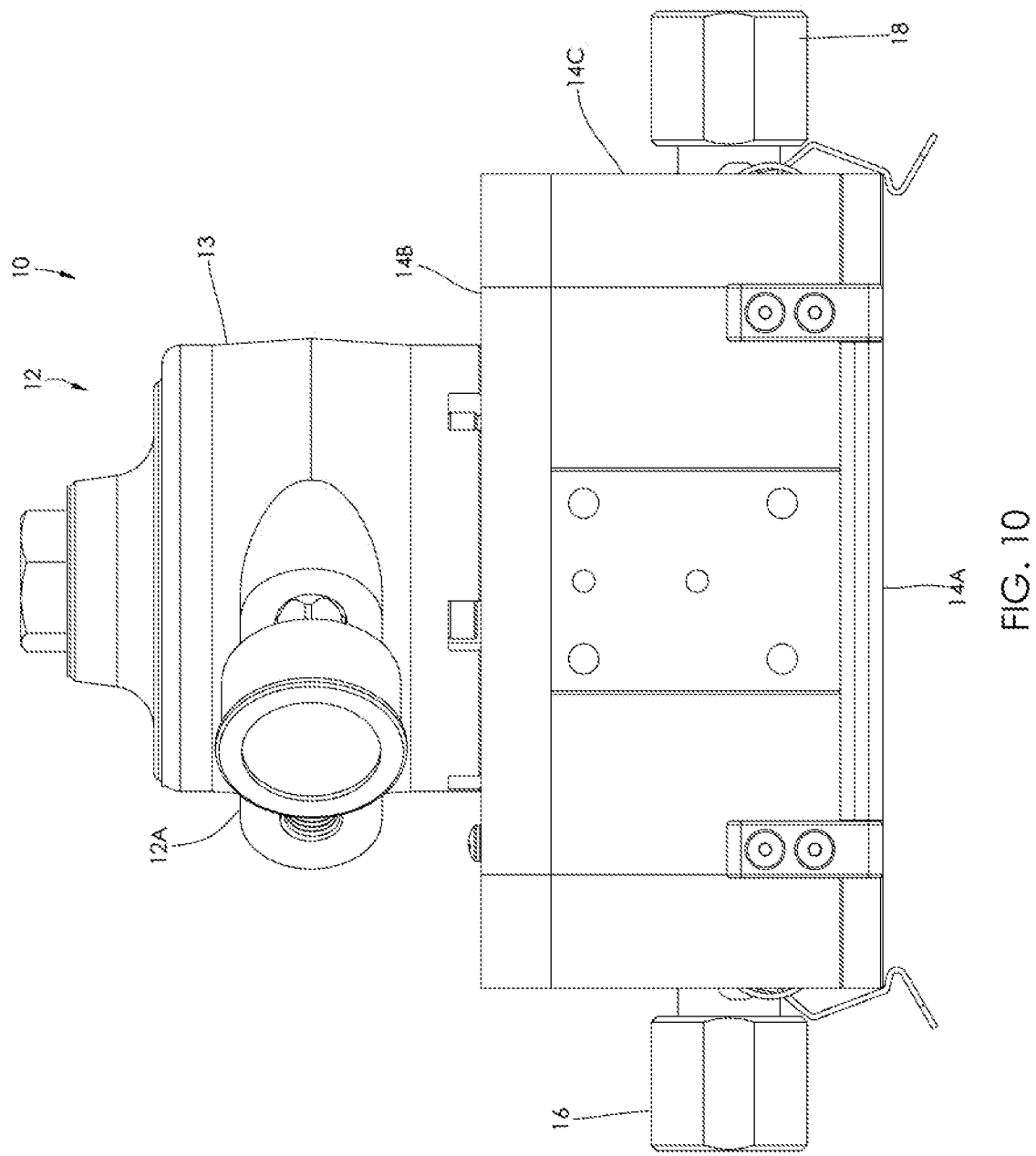
FIG. 10 is a bottom view of the device in accordance with an aspect of the disclosure.
Figure 11:
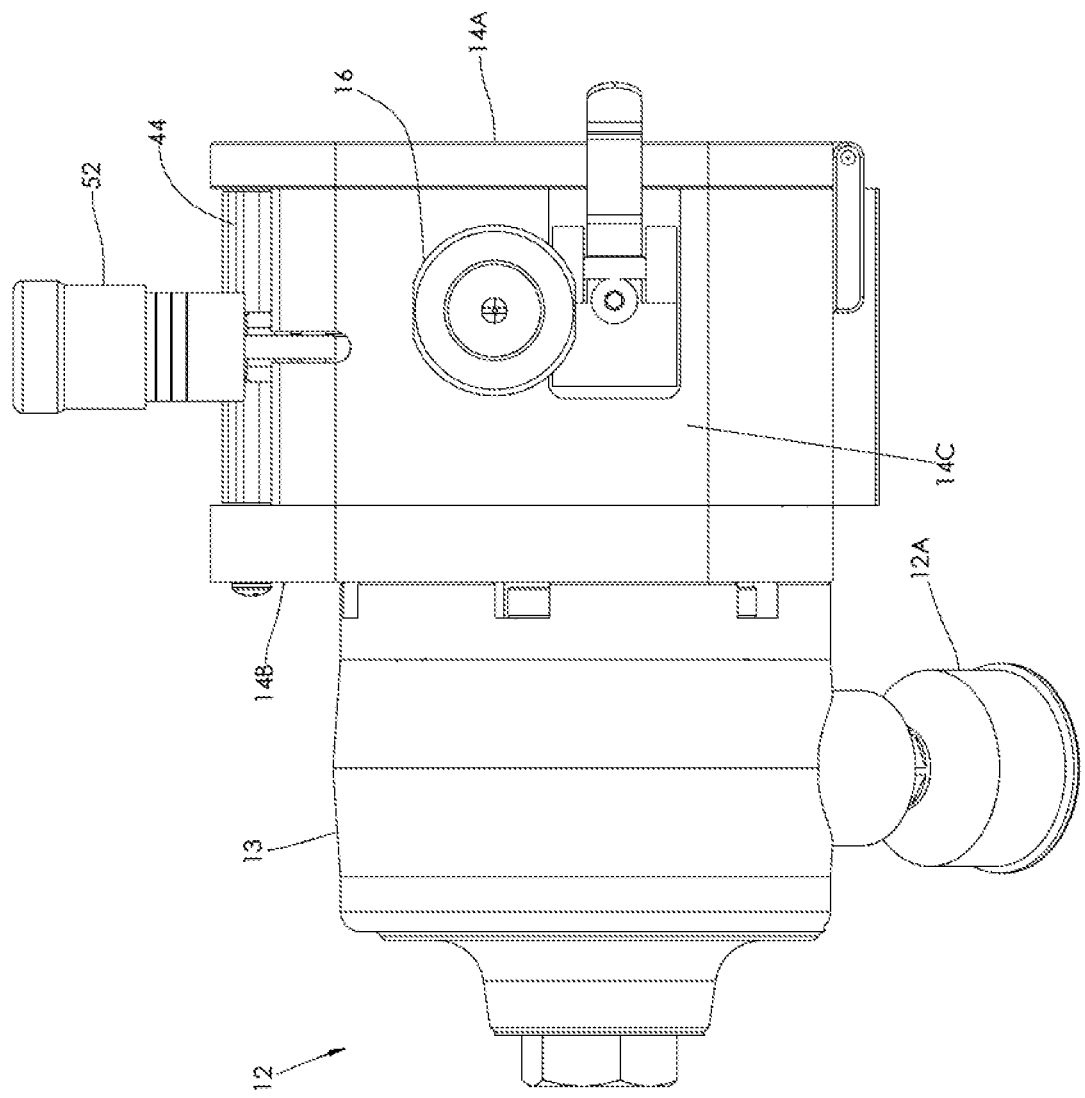
FIG. 11 is a left side view of the device in accordance with an aspect of the disclosure.

In one aspect, the teeth 28A, 28B, 32A, 32B of the bearings may be axially offset from the drive surfaces 26A, 26B, 30A, 30B of the bearings, as shown in FIGS. 5 and 6. In one aspect, the teeth 28A, 28B, 32A, 32B may be generally disposed adjacent the rear of the cavity 15, with the surfaces disposed in the middle of the cavity 15 and aligned with the direction of the electrode 20 as defined by the inlet 16 and outlet 18 through which the electrode 20 is drawn.

As shown in FIGS. 5 and 6, the surfaces 26A, 26B, 30A, 30B may be generally flat surfaces rather than concave surfaces, and may, in one aspect, include circumferential grooves. Such flat surfaces may be disposed spaced apart vertically from each other to accommodate the thickness of the electrode 20 when the electrode is passing through the space and between the surfaces 26A, 26B, 30A, 30B.

The teeth 28A, 28B, 32A, 32B may be disposed on a separate disc-like structure that is attached to another separate disc-like structure that defines the surfaces 26A, 26B, 30A, 30B. Thus, the bearings 22A, 22B, 24A, 24B may be in the form of a multi-piece structure that is fixedly joined and secured together. This multi-piece approach may be used to alter the strength and/or stiffness and/or friction qualities of the surfaces 26A, 26B, 30A, 30B that engage the electrode 20, which may be different than the material qualities of the teeth 28A, 28B, 32A, 32B that are meshed engagement and undergoing different forces. However, in another approach, the teeth 28A, 28B, 32A, 32B and the surfaces 26A, 26B, 30A, 30B that drive the electrode 20 may be part of the same unitary structure.

With reference again to FIG. 2, central sprocket 40 is also disposed within the cavity 15, and is configured to drive the bearings 24A-B and 26A-B. The central sprocket 40 has a plurality of external gear teeth 42 adjacent or near the perimeter of the central sprocket 40. The sprocket 40 is illustrated as a spur gear that engages the bearing 22B and 24B. However, it will be appreciated that other gear types may also be used that engage one or both gears 22B and 24B. In one aspect, the sprocket 40 may also be referred to as a driving gear system 40, which may include other gear types or gear mechanism, including reduction gearsets, such that intermediate gears may be disposed between sprocket 40 and the gears 22B and 24B.

The teeth 42 of the central sprocket 40 are arranged such that they mesh with the teeth 28B of bearing 22B and mesh with the teeth 32B of the bearing 24B. As such, when the central sprocket 40 rotates, the central sprocket then drives both bearings 22B and 24B directly. From there, bearings 22B and 24B drive bearings 22A and 24A, respectively. Put another way, the bearings 22B and 24B are directly driven by rotation of the sprocket 40, and bearings 22A and 24A are indirectly driven by the sprocket 40. The bearings 22A and 24A are then directly driven by the bearings 22B and 24B, respectively. Thus, the bearing 22B and 24B may be considered primary bearings, and the bearings 22A and 24A may be considered secondary bearings.

The sprocket 40 is arranged to be engaged with the bearings 22B and 24B at all times via the meshed engagement. Put another way, the sprocket 40 is common driving mechanism for both the bearings 22B and 24B. Rotation of the sprocket 40 therefore inherently drives both bearings 22B and 24B. When bearing 22B rotates, bearing 24B also rotates because they are both meshed with the sprocket 40. Put another way, bearings 22B and 24B rotate concurrently.

In one aspect, bearings 22B and 24B are arranged to rotate in the same rotational direction concurrently. As shown in FIG. 2, sprocket 40 is meshingly directly engaged and in contact with the bearings 22B and 24B and is disposed laterally between and/or axially offset and between the bearings 22B and 24B.

In one aspect, the sprocket 40 rotates about an axis that is parallel to the axes of rotation of the bearings 22A-B and 24A-B. However, in another aspect, the sprocket 40 may be in the form of a worm, helical, bevel, or other gear type such that the axis of the sprocket may be arranged non-parallel to the axes of rotation of the bearings.

A motor 12, that is generally disposed outside of the housing 14 but could, in some examples, be disposed within the cavity 15 of the housing 14, functions to drive the central sprocket 40. As such, because only the central sprocket 40 is directly turned by the motor 12, the central sprocket 40 essentially functions so as to provide a drive turning force to the bearings 22A, 22B, 24A, and 24B. The motor 12 may be any type of device capable of providing a rotational output force to the central sprocket 40. As such, the motor 12 could be any type of motor, such as, as examples, electric, internal combustion, pneumatic, or hydraulic motor. In a preferred aspect, the motor 12 is pneumatic motor including an air inlet 12a configured for attachment to a supply of pressurized air. Provision of pressurized air into the motor 12 can drive the output shaft and the sprocket 40 in the desired rotational direction. The air inlet 12a may be selectively moveable on the motor 12 to control the direction of rotation of the output shaft of the motor 12.

FIG. 1 illustrates a motor housing 13 extending outwardly from the device housing 14. In one aspect, the motor housing 13 may be considered part of the device housing 14. The motor housing 13 may be secured to the device housing 14, with an opening in the device housing 10 providing access to an output shaft of the motor 12 to which the sprocket 40 is rotationally fixed.

The device housing 10 may include a front portion 14A and a rear portion 14B, which may have a generally plate-like shape. The device housing 10 may further include a sidewall portion 14C that extends between the front portion 14A and the rear portion 14B and which may have a U-shape that is open at the top. The sidewall portion 14C may be in the form of two pieces joined together at the bottom, in one aspect, as shown through the figures. The front portion 14A may be attached to the sidewall portion 14C via clips 11A and a hinge 11B, thereby permitting selective access to the interior of the device 10 by opening the front portion 14A. The front portion 14A may include a transparent or translucent window portion 11C for viewing the interior of the device.

During operation of the motor 12, the sprocket 40 is rotated in a first rotational direction. For example, the sprocket may be rotated counter-clockwise in FIG. 2. Due to the meshed engagement with both bearings 22B and 24B, the bearings 22B and 24B rotate in a second rotational direction that is opposite the first rotational direction, for example clockwise in FIG. 2 when sprocket 40 rotates counter-clockwise. Such rotational direction drives the electrode 20 to the right in FIG. 2.

The direct meshed engagement between the sprocket 40 and the bearings 22B and 24B thereby results in the linear velocity at the perimeter of the sprocket 40 and the bearings 22B, 24B to be effectively the same. The angular velocity of these meshed and rotating components may vary depending on the relative diameters of the components. In one aspect, the diameters of the bearings 22B and 24B are the same, such that they rotate at the same angular velocity relative to each other. In one aspect, the sprocket 40 has the same diameter as the bearings 22B, 24B such that they rotate at the same angular velocity.

This arrangement of a single motor 12 and sprocket 40 has certain advantages in that separate motors do not need to be utilized to drive the bearings 22A, 22B, 24A, and 24B. Thus, separate motors do not need to be controlled to rotate at the same rate to create corresponding feed rates for the bearings. By utilizing only one motor, cost savings can be realized as well that the 22A, 22B, 24A, and 24B will each turn in unison limiting issues with the feeding of the consumable electrode wire 20 through the device 10.

Additionally, the use of the two bearings 22B and 24B rotating at the same rate to the feed the electrode 20 thereby creates a redundancy in the event one bearing slips relative to the electrode 20 or the electrode shifts out of engagement with the bearings.

The bearing 22A and/or bearing 24A may be mounted within the cavity 15 by utilizing mounting plates 44 and 46, respectively. The mounting plates 44 and 46 may have an axis of rotation defined by mounting screws 45. Put another way, the mounting plates 44 and 46 may be permitted to pivot about mounting screws 45. This pivotable movement allows for the bearings 22A and 24B to be taken out of engagement with the bearings 22B and 24B. It will be appreciated that the mounting screws 45 may also be in the form of pins or rivets or other axially arranged securing mechanism that retains the mounting plates 44 and 46 within the cavity while allowing for pivotal movement about the screws 45. The mounting plates 45 may be sized and arranged in a symmetrical manner within the cavity 15, and may effectively be a mirror-image of each other when installed within the cavity.

In one aspect, the mounting plates 44, 46 may in the form of a hollow member or frame with opposing flange portions 44A, 44B, 46A, 46B (such as front and rear portions) that are disposed on opposite axial sides of the bearings 22A and 24A. A pin or other axial structure may extend axially between the front/rear portions for supporting the bearings 22A and 24A for rotation.

Each of the mounting plates 44 and 46 may have a tongue portion 47 and 49 respectively. Each of the tongue portions 47 and 49 may be biased by biasing members 48 and 50 towards adjustment mechanisms 52 and 54, respectively. The tongue portions 47 and 49 are configured to pivot up and away from the biasing members 48, 50 about the mounting screws 47 and 47. In another aspect, the biasing members 48 and 50 may be excluded, and the tongue portions 47 and 49 may directly contact an upper edge of sidewall portion 14C. The tongue portions 47 and 49 may be spaced apart from the upper edge/surface of the sidewall portion 14C due to the electrode 20 being disposed between the respective contact surfaces of the bearing pairs when the mounting plates 44 and 46 are in a lowered position and secured by the adjustment mechanisms 52 and 54. The upper edge surface of the sidewall 14C may be tapered with the tongue portions 47 and 49 having a corresponding tapered surface that faces the upper edge of the sidewall 14C.

The adjustment mechanisms 52 and 54 may be thumb-screw type adjustment mechanisms that allow one to provide an opposing force to the tongue portions 47 and 49 of the mounting plates 44 and 46, respectively. This opposing force opposes the force provided by the biasing members 48 and 50 or other reaction force. As such, the adjustment mechanisms 52 and 54 allow one to adjust the space located between the bearings 22A and 22B and the space between 24A and 24B, respectively.

The adjustment mechanisms 52 and 54 may be pivotally fixed to the side portion 14C of the housing 14 of the device 10, allowing the adjustment mechanisms 52 and 54 to be pivoted away from and out of engagement with the tongue portions 47, 49, such that tongue portions 47 and 49 may be pivoted upward to provide access within the housing 14, as shown in FIG. 6. To secure the tongue portions 47, 49 against the housing 14, the tongue portions 47, 49 may be pivoted back into position against the biasing members 48, 50, and the adjustment mechanisms may be pivoted such that they are disposed over the tongue portions 47, 49, and can be adjusted and tightened to apply a force on the tongue portions 47, 49 against the biasing members, as shown in FIG. 5.

The mounting plates 44 and 46 may therefore be moveable between an open state (FIG. 6) and a closed state (FIG. 5). Similarly, the adjustment mechanism are moveable between an open state (FIG. 6) and a closed state (FIG. 5).

The adjustment mechanism 52, 54 may include a spring 55A disposed within a cylinder 55B and a cap 55C that is adjustable relative to the cylinder 55B. Adjustment of the cap 55C may cause the cylinder 55B to be forced up/down in combination with the bias of the spring 55A. Alternatively, the cylinder 55B may simply be slidable relative to the cap 55B, with the spring 55A biasing the cylinder into engagement with the tongue portion 47, 49 to secure the tongue portions 47, 49 in the closed state when the adjustment mechanisms 52, 54 are moved to the closed state.

The rear portion 14B of the housing 14 may include curved slots 51 that may receive the pins that support the bearings 22A, 24A. Thus, when the mounting plates 44, 46 pivot upward about screws 45, the pins may travel along the slots 51 along a radiused, curved path defined by the slots 51.

In addition, the space located between the bearings 22A and 22B and the space located between the bearings 24A and 24B may vary as the device 10 is used. Moreover, in situations where the electrode 20 has been completely spent and is no longer located within the cavity 15, the tongue members 47 and/or 49 may move slightly and provide a different force applied to the adjustment mechanisms 52 and 54 respectively. Additionally, in situations where there is an issue with the feeding of the electrode 20 through the device 10, such as a knot or imperfection in the electrode, an opposing force may be applied against the adjustment mechanisms 52 and 54, respectively. The lack of force from the absence of an electrode 20 or the increased force from the imperfection or knot can be detected by a control system 200 (FIG. 12) or other computing device having instructions and software algorithms for detecting changes in force via the use of sensors 58, 158 in operative communication with the control system 200 via signals or other communication methods.

Figure 12:
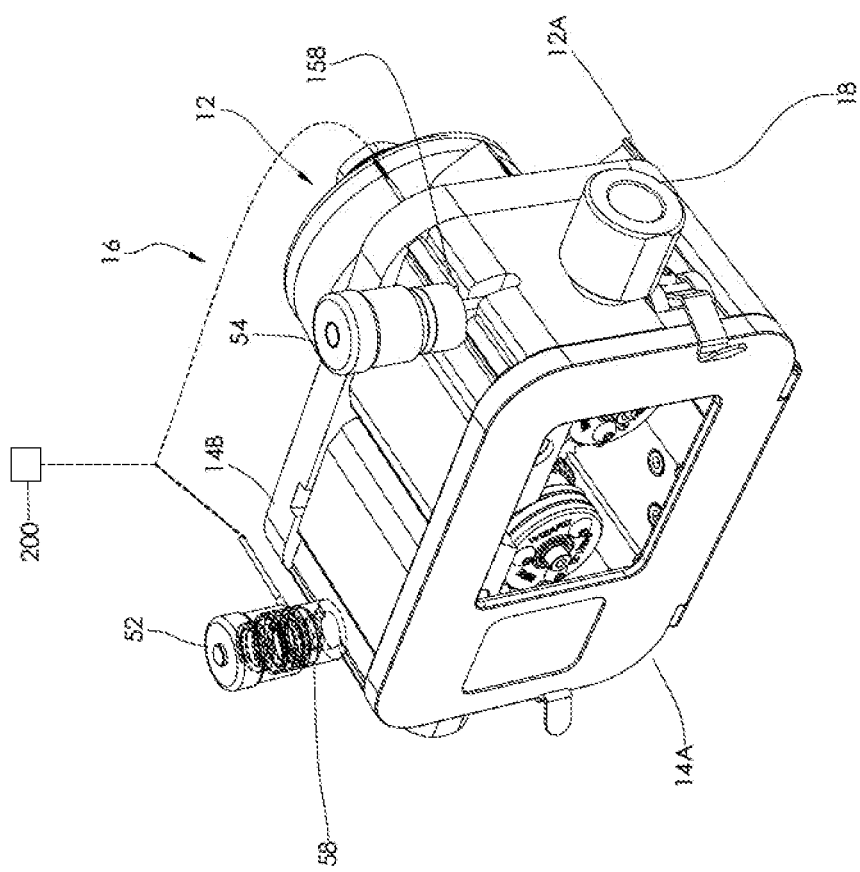
FIG. 12 is right side perspective view of the device illustrating sensors in operative communication with a computing device in accordance with an aspect of the disclosure.
Figure 13:
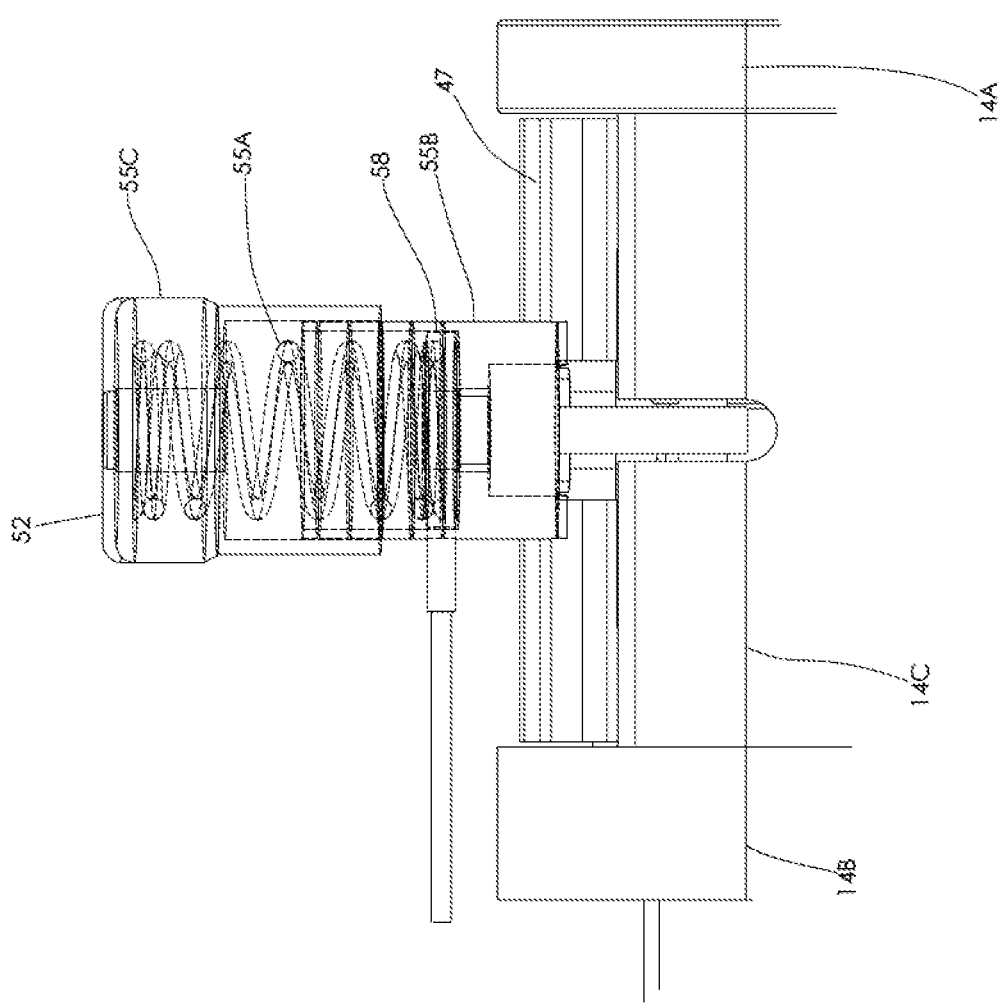
FIG. 13 is a perspective view of an adjustment mechanism having a cap, cylinder, and spring, and having a sensor disposed within the adjustment mechanism for detecting changes in the force applied to a corresponding mounting plate.
Figure 14:
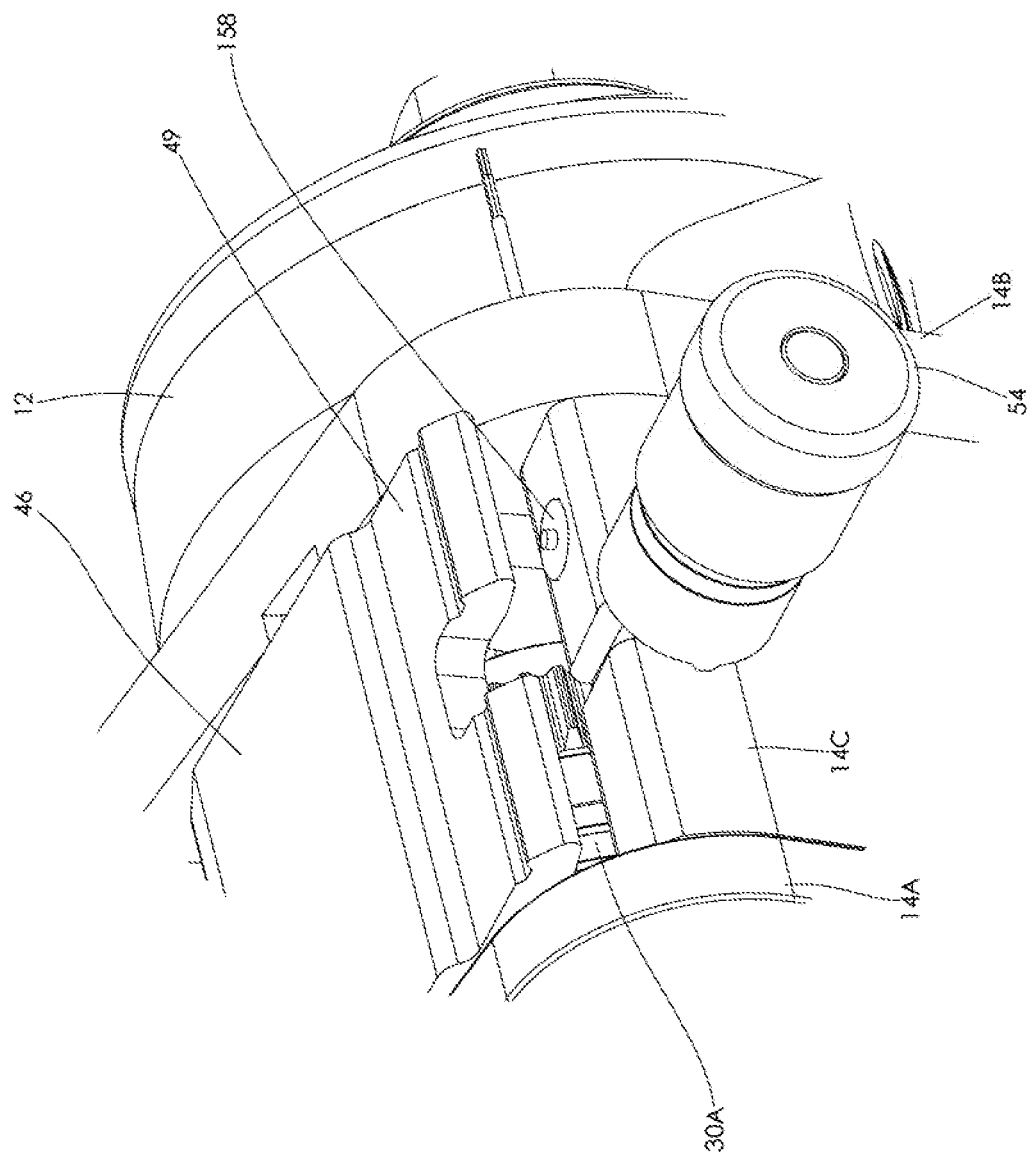
FIG. 14 is a perspective view of an adjustment mechanism in an open state and illustrating another sensor disposed on a sidewall portion of the device and arranged to be disposed below a tongue portion of the mounting plate.

For these types of situations, sensors 58 and/or 158 may be provided, as shown in FIGS. 12-14. In one aspect, shown in FIGS. 12 and 13, the adjustment mechanisms 52 and 54 may include force sensor 58. The force sensor 58 may be disposed within the adjustment mechanism and is capable of measuring the force applied to the adjustment mechanism 52 by the tongue portion 47 of the mounting plate 44. By monitoring signals generated by the force sensor 58 indicative of the force applied to the adjustment mechanism 52, one can electronically monitor issues or problems that may arise during the use of the device 10, such as issues when the electrode 20 is completely spent and/or issues regarding to imperfections with the electrode 20 or malfunction of the device 10.

In another aspect, shown in FIGS. 12 and 14, force sensors 158 may be disposed outside of the adjustment mechanisms 52, 54, and may be disposed between one or both of the tongue portions 47, 49 and the side portion 14C of the housing 14. For example, as shown in FIG. 14, force sensor 158 may be disposed on a top end of the sidewall portion 14C, such that when the tongue portion 47 or 49 is tightened by adjustment mechanism 52 or 54, the force sensor 158 will detect a reaction force. During operation of the feeding of the electrode 20, the force detected by the force sensor 158 may be monitored via control system 200. If an imperfection or knot passes through the bearings of the device 10, the tongue portions 47, 49 will be pushed upward, reducing the force applied to the force sensor 158. Similarly, if the electrode 20 is spent and the tongue portion is no longer being forced upward by the presence of the electrode, the adjustment mechanism 52, 54 may apply a greater force onto the force sensor 158.

As a person skilled in the art will readily appreciate, the above description is meant as an illustration of an implementation of the principles of this invention. This description is not intended to limit the scope or application of this invention in that the invention is susceptible to modification, variation, and change, without departing from the spirit of this invention, as defined in the following claims.

The invention claimed is:

1. A device for feeding a wire electrode, the device comprising:
   a motor;
   a housing having an input port and an output port, wherein the input port is configured to receive the wire electrode and the output port is configured to output the wire electrode,
   a cavity defined by the housing;
   a first group of bearings disposed within the housing and comprising at least two bearings, each of the bearings having a surface adjacent or near an outer perimeter of the bearings of the first group configured to engage the wire electrode, wherein the wire electrode engages the bearings forming the first group in a space defined between the bearings forming the first group;
   wherein the first group of bearings each have teeth adjacent to or near an outer perimeter of each of the bearings of the first group, wherein the teeth of each of the bearings are configured to mesh with each other;
   a second group of bearings disposed within the housing and comprising at least two bearings, each of the bearings having a surface adjacent to or near a perimeter of the bearing configured to engage the wire electrode;
   wherein the wire electrode engages the bearings forming the second group in a space defined between the bearings forming the second group;
   wherein the second group of bearings each have teeth adjacent to or near a perimeter of each of the bearings of the second group, wherein the teeth of each of the bearings are configured to mesh with each other; and
   a drive sprocket having teeth, wherein the drive sprocket is positioned in the cavity of the housing so as to engage and mesh with the teeth of one of the bearings of the first group and the teeth of one of the bearings of the second group;
   wherein at least one of the bearings of the first group or one of the bearings of the second group is mounted to a pivotable mounting plate,
   wherein the pivotable mounting plate has an axis of rotation that is parallel to the axis of rotation to the bearings of the first group or the second group,
   wherein the pivotable mounting plate further comprises a biasing member and an adjustment device,
   wherein the biasing member is configured to bias the pivotable mounting plate towards the adjustment device,
   wherein the adjustment device is a thumbscrew type adjustment mechanism to provide an opposing force to portions of the mounting plates;
   wherein the drive sprocket is in mechanical communication with the motor disposed outside the cavity, wherein the motor is configured to turn the drive sprocket,
   wherein the motor is a pneumatic drive;
   wherein the adjustment device further comprises a force sensor, the force sensor configured to generate a signal indicative of a force between the biasing member and the adjustment device.

2. A device for feeding a wire electrode, the device comprising:

a housing having an input port and an output port, wherein the input port is configured to receive the wire electrode and the output port is configured to output the wire electrode, a cavity defined by the housing;

a first group of bearings disposed within the housing and comprising at least two bearings, each of the bearings having a surface adjacent or near an outer perimeter of the bearings of the first group configured to engage the wire electrode, wherein the wire electrode engages the bearings forming the first group in a space defined between the bearings forming the first group;

wherein the first group of bearings each have teeth adjacent to or near an outer perimeter of each of the bearings of the second group, wherein the teeth of each of the bearings are configured to mesh with each other;

a second group of bearings disposed within the housing and comprising at least two bearings, each of the bearings having a surface adjacent to or near a perimeter of the bearing configured to engage the wire electrode; wherein the wire electrode engages the bearings forming the second group in a space defined between the bearings forming the second group;

wherein the second group of bearings each have teeth adjacent to or near a perimeter of each of the bearings of the second group, wherein the teeth of each of the bearings are configured to mesh with each other; and a drive sprocket having teeth, wherein the drive sprocket is positioned in the cavity of the housing so as to engage and mesh with the teeth of one of the bearings of the first group and the teeth of one of the bearings of the second group;

wherein at least one of the bearings of the first group or one of the bearings of the second group is mounted to a rotatable frame, wherein the rotatable frame has an axis of rotation that is parallel to the axis of rotation to the bearings of the first group or the second group.

3. The device of claim 2, wherein the rotatable frame further comprises a biasing member and an adjustment device, wherein the biasing member is configured to bias the rotatable frame towards the adjustment device.

4. The device of claim 3, wherein the adjustment device is a threaded adjustment device.

5. The device of claim 4, wherein the adjustment device further comprises a force sensor, the force sensor configured to generate a signal indicative of a force between the biasing member and the adjustment device.

6. The device of claim 1, wherein each of the bearings define a circumferential surface configured to engage and drive the electrode in response to rotation of the bearings.

7. The device of claim 6, wherein the circumferential surface is flat.

8. The device of claim 6, wherein the teeth of each of the bearings are offset axially from the circumferential surface.

9. The device of claim 8, wherein the teeth of each of the bearings are disposed on a separate structure than the circumferential surface.

10. The device of claim 1, further comprising a pair of the pivotable mounting plates, wherein each of the mounting plates supports one of the bearings of the group of bearings for rotation.

11. The device of claim 10, wherein the mounting plates have an open state and a closed state, wherein in the open state the mounting plates are pivoted away from the closed state to increase the space between the bearings of each group of bearings.

12. The device of claim 11, further comprising at least one sensor disposed between at least one of the mounting plates and a sidewall portion of the housing when the at least one of the mounting plates is in the closed state.

13. The device of claim 1, wherein all of the bearings are rotated in response to rotation of the sprocket, wherein the sprocket directly contacts and meshes with a first one bearing of each group of bearings, and the other bearing of each group of bearings is directly contacted and driven by rotation of the first bearing of each group of bearings.

14. A method for conveying a consumable electrode, the method comprising the steps of:

rotating a first drive sprocket;

in response to rotating the first drive sprocket, directly rotating a first primary bearing and a second primary bearing via direct meshed contact between the first drive sprocket and the first primary bearing and direct meshed contact between the sprocket and the second primary bearing;

in response to rotating the first and second primary bearings, rotating first and second secondary bearings via direct meshed contact with the first and second primary bearings, respectively;

frictionally engaging a consumable electrode between the first primary bearing and the first secondary bearing, and frictionally engaging the consumable electrode between the second primary bearing and the second secondary bearing;

driving the consumable electrode in a first direction in response to the frictional engagement and concurrent rotation of the first and second primary bearings and the first and second secondary bearings;

wherein the sprocket is rotated in response to actuating a pneumatic drive;

wherein the method comprises the step of detecting, via a sensor disposed in mechanical communication with at least one of the first secondary bearing and the second secondary bearing, a change in force applied to the first secondary bearing or the second secondary bearing in response to a change in the consumable electrode being conveyed through the device.

15. The method of claim 14 further comprising pivoting the first and second secondary bearings out of meshed contact with the first and second primary bearings via pivotal movement of pivotable mounting plates that support the first and second secondary bearings for rotation.

16. The method of claim 15, wherein the pivotable mounting plate has an axis of rotation that is parallel to the axis of rotation to the first and second secondary bearings;

wherein the pivotable mounting plate further comprises a biasing member and an adjustment device, wherein the biasing member is configured to bias the pivotable mounting plates and the first and second secondary bearings away from the first and second primary bearings and towards the adjustment device, wherein the adjustment device is a thumbscrew type adjustment mechanism that provides an opposing force to portions of the mounting plates that opposes the biasing member.

17. The method of claim 16, wherein the sensor is disposed within the adjustment device and detects a force that is applied by the mounting plate in the direction toward the adjustment device, and detects the change in the force based on a pivoting movement of the pivotable mounting plate toward or away from the adjustment device due to a bulge in the electrode or a lack of the electrode, respectively.

18. The method of claim 16, wherein the mounting plates are pivotably mounting to a housing, wherein the housing contains the drive sprocket and the bearings, wherein the sensor is disposed outside of the adjustment device and is disposed on an opposite side of the mounting plate from the adjustment device between the mounting plate and the housing, wherein the sensor detects a force applied on mounting plate in a direction toward the housing, wherein the sensor detects a decreased force in response movement of the mounting plate away from the housing, and the sensor detects an increased force in response to movement of the mounting plate toward the housing due to a bulge in the electrode or a lack of the electrode, respectively.

\* \* \* \* \*